United States Patent [19]

Gilchrist

[11] Patent Number: 4,991,148
[45] Date of Patent: Feb. 5, 1991

[54] ACOUSTIC DIGITIZING SYSTEM

[76] Inventor: Ian R. Gilchrist, 2318 Springlake Dr., Timonium, Md. 21093

[21] Appl. No.: 412,885

[22] Filed: Sep. 26, 1989

[51] Int. Cl.$^5$ .............................................. G08C 21/00
[52] U.S. Cl. .................................. 367/124; 367/907; 178/18
[58] Field of Search ............... 367/907, 124, 127, 129, 367/165, 173, 188, 99; 178/18, 19; 340/710; 364/561

[56] References Cited

U.S. PATENT DOCUMENTS

| | | | |
|---|---|---|---|
| 3,454,922 | 7/1969 | Dory | 367/97 |
| 3,504,334 | 3/1970 | Turnage, Jr. | 367/907 |
| 3,731,273 | 5/1973 | Hunt | 367/127 |
| 3,821,469 | 6/1974 | Whetstone et al. | 178/18 |
| 3,838,212 | 9/1974 | Whetstone et al. | 367/113 |
| 3,924,450 | 12/1975 | Uchiyama et al. | 367/907 |
| 4,012,588 | 3/1977 | Davis et al. | 178/18 |
| 4,124,838 | 11/1978 | Kiss | 367/907 |
| 4,246,439 | 1/1981 | Romein | 178/18 |
| 4,357,672 | 11/1982 | Howells et al. | 364/561 |
| 4,380,807 | 4/1983 | Reynard | 367/97 |
| 4,577,057 | 3/1986 | Blesser | 178/18 |
| 4,654,648 | 3/1987 | Herrington | 340/710 |
| 4,758,691 | 7/1988 | DeBruyne | 178/19 |
| 4,777,329 | 10/1988 | Mallicoat | 178/18 |
| 4,814,552 | 3/1989 | Stefik et al. | 178/18 |

OTHER PUBLICATIONS

Van Valkenburg et al., Network Analysis, 1974, pp. 420-427.

Primary Examiner—Thomas H. Tarcza
Assistant Examiner—Daniel T. Pihulic
Attorney, Agent, or Firm—Perman & Green

[57] ABSTRACT

An acoustic position sensing apparatus is described which determines the position of an indicator in relation to a datum surface or volume. The apparatus comprises an acoustic point source transmission device mounted on the indicator for transmitting a sequence of periodic acoustic oscillations, and a plurality of acoustic point receivers positioned about the datum surface for receiving the acoustic oscillations. Comparators are connected to each acoustic receiver for converting the received acoustic oscillations to squared waves having logical up and down levels. A register or other time determining circuit is coupled to each comparator and receives at least a leading portion of a squared wave and determines that the squared wave has resulted from an acoustic oscillation generated by said acoustic point source transmission device. It provides an output upon making such a determination, which is indicative of an occurrence of a step transition of the squared wave. A processor is responsive to the outputs from the registers to find the position of the indicator. The acoustic point source transmission device is configured both as a linear stylus and as a planar "puck", both having at least a pair of acoustic transmitters. The apparatus employs, for two dimensional position detection, at least three acoustic receivers arranged in a non-linear fashion. A three dimensional position detector system is described which employs four receivers, three of which are oriented in one plane and a fourth in another plane.

19 Claims, 6 Drawing Sheets

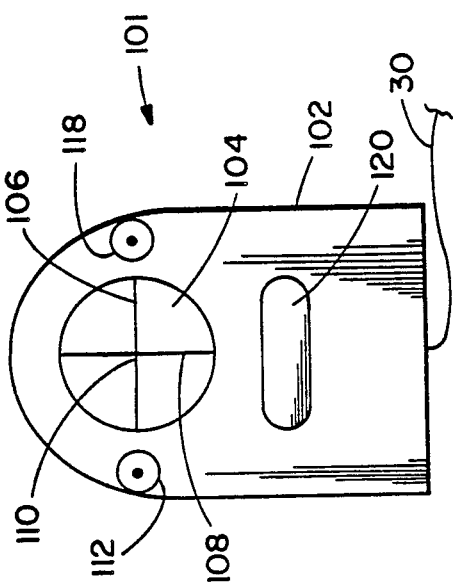
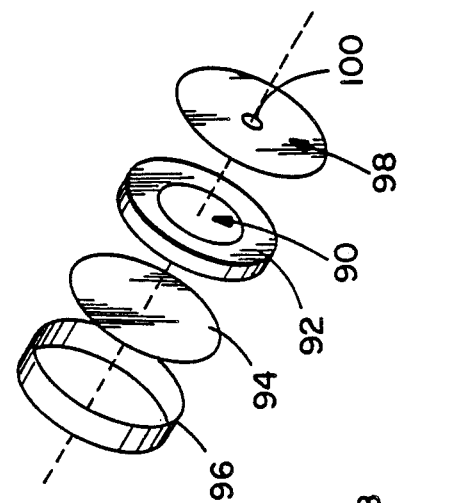
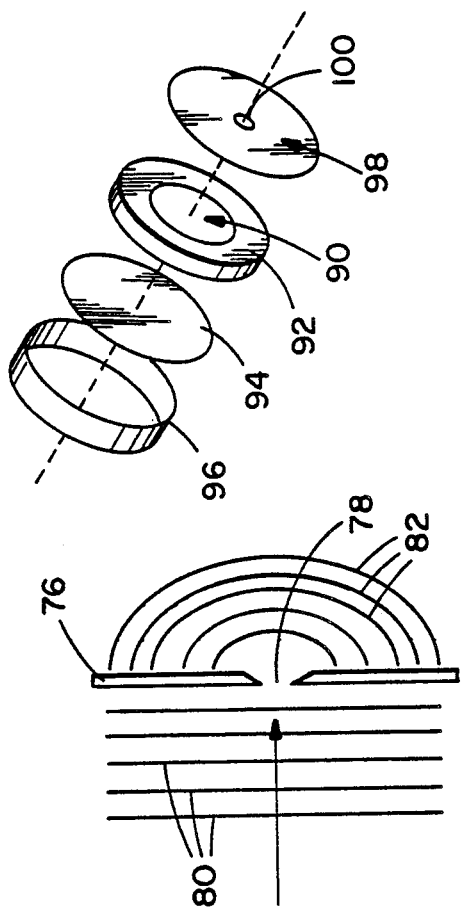
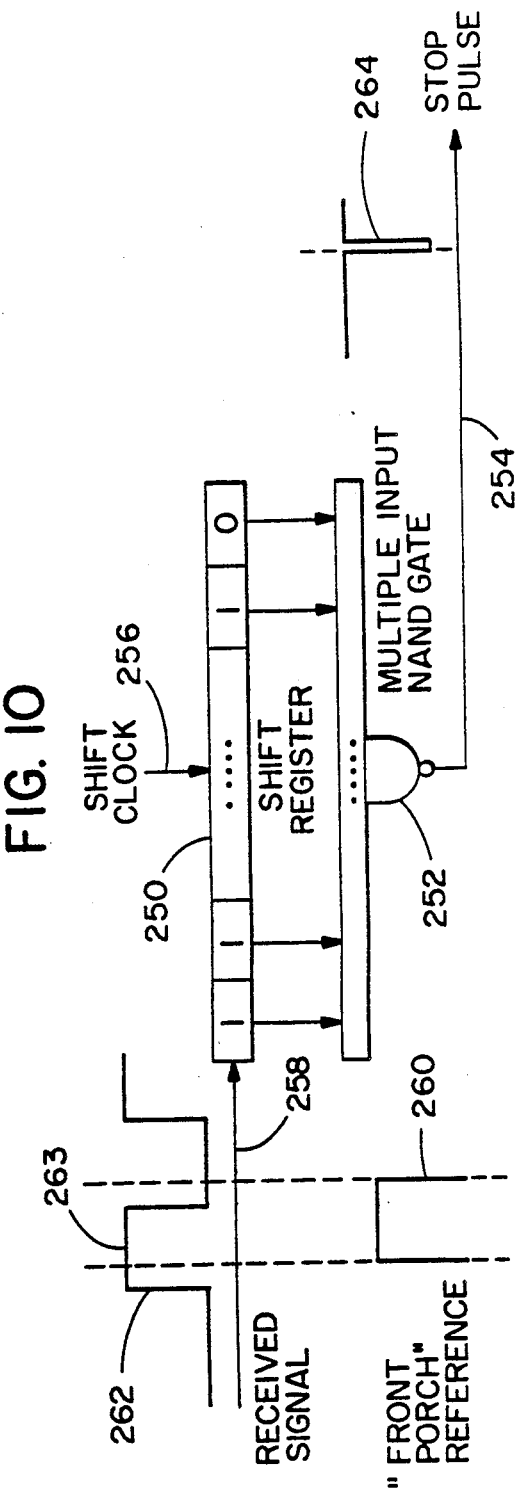

ively oriented, linear microphones. The arrival of the spark acoustic signal at a microphone is detected by an amplitude discrimination circuit and then passed to a timing circuit which compares the time of arrival of the signal with the time of the signal's generation, to thereby achieve a range determination Spark-acoustic position determining systems are disclosed in U.S. Pat. Nos. 3,838,212 to Whetstone et al.; 4,012,588 to Davis et al.; 3,821,469 to Whetstone et al.; 4,357,672 to Howells et al.; and 3,731,273 to Hunt. Spark-based acoustic ranging systems exhibit a number of disadvantages. The generated spark creates both possible shock and fire hazard, makes an audible noise which is, at times disconcerting, and creates electromagnetic interference. Further, since the spark generates a shock acoustic wave, its detection is dependent upon the accurate sensing of the leading edge of the wavefront. Due to changes in amplitude as the spark source is moved relative to the microphones, and further, due to the wavefront's non-linear rise time, accurate sensing is difficult to implement reliably. In fact, systems which employ spark gap ranging exhibit a limited distance resolution specifically due to the detection problems which arise from the use of a shock acoustic wave.

A further class of acoustic wave position determining systems employ emitted, periodic, acoustic signals for ranging purposes. For instance, in U.S. Pat. No. 3,504,334 to Turnage, Jr., microphone receivers of the bar type are oriented along X and Y axes, and measure the propagation time of an acoustic signal from a measuring point to the respective receivers. The measured times are converted to minimum distances between the measuring point and the respective receivers, thereby enabling the coordinates of the measuring point to be determined. Bar-type microphones, (used by the Turnage, Jr.) are both expensive and are difficult to apply to limited-size position determining systems (e.g. desk top size). Furthermore, the accuracy of systems which employ bar-type microphones depends on the uniformity of the emitted acoustic wavefront, and if there is any aberration in the wavefront, inaccurate range measurements result.

Another patent which employs bar-type microphones is No. 4,246,439 of Romein. Romein employs a pair of acoustic transmitters mounted on a stylus, which transducers enable the precise position of the stylus tip to be determined.

Others have attempted to overcome the above-stated problems by employing discrete, point microphone receivers. In U.S. Pat. No. 3,924,450 of Uchiyama et al., a three dimensional acoustic range determining system is broadly described and includes three microphones placed about a surface to be digitized. A stylus having two acoustic sources is used to point to various points on the 3-D surface. Signals from the stylus are received by the microphones and analyzed to determine the digital position of the surface point. Little detail is given of the measurement method employed by Uchiyama et al.

Another acoustic point digitizer employing a wireless stylus or puck is described by Herrington et al. in U.S. Pat. No. 4,654,648. In that system, a stylus emits acoustic signals and a linear array of microphones receives the signals and determines the position of the stylus by hyperbolic triangulation. Herrington et al. uses point source acoustic transmitters which enable uniform transmission patterns to be achieved. The measurement technique employed by Herrington et al. that the output from the sensing microphones be selectively switched to feed into a detector circuit, which circuit in addition to including a zero crossing detector, also samples and holds the value of peak amplitudes of each cycle. This data is used to determine range information and from that, to obtain positional triangulation of the acoustic transmitter. While the Herrington et al. system overcomes many prior art problems, its use of a linear array of microphones; the switching of the microphones; and the sampling of the input signals to determine instantaneous amplitudes all present problems which lead to an unnecessarily complex and expensive system.

Accordingly, it is an object of this invention to provide an acoustic position determining system which provides improved position accuracy and detection.

It is another object of this invention to provide an acoustic position digitizing system which is not dependant upon the amplitude of a received acoustic signal.

It is still another object of this invention to provide an acoustic position determining system which enables arbitrary positioning of acoustic receiving units.

It is another object of this invention to provide an acoustic position determining system which is easily calibrated.

It is a further object of this invention to provide an acoustic position digitizing system which employs an open-loop signal processing element for determining the time of arrival of an acoustic signal.

SUMMARY OF THE INVENTION

An acoustic position sensing apparatus is described which determines the position of an indicator in relation to a datum surface or volume. The apparatus comprises an acoustic point source transmission device mounted on the indicator for transmitting a sequence of periodic acoustic oscillations, and a plurality of acoustic point receivers positioned about the datum surface for receiving the acoustic oscillations. Comparators are connected to each acoustic receiver for converting the received acoustic oscillations to square waves having logical up and down levels. A register or other time determining circuit is coupled to each comparator and receives at least a leading portion of a square wave and provides an output if it determines that the portion exhibits one of the aforesaid logical levels for a predetermined time duration. A processor is responsive to the outputs from the registers to find the position of the indicator.

The acoustic point source transmission device is configured both as a linear stylus and as a planar "puck", both having at least a pair of acoustic transmitters. The apparatus employs, for two dimensional position detection, at least three acoustic receivers arranged in a non-linear fashion. A three dimensional position detector system is described which employs four receivers, three of which are oriented in one plane and a fourth in another plane.

BRIEF DESCRIPTION OF THE DRAWINGS

FIG. 6 is an acoustic diagram helpful in understanding the operation of the acoustic transmitter of FIG. 4.

FIG. 7 is an exploded view of an acoustic receiver employed by the invention.

FIG. 8 is a plan view of a puck with a pair of acoustic transmitters mounted thereon.

FIG. 10 is a schematic block diagram of a preferred signal detector for sensing the "front porch" of a received acoustic signal.

DETAILED DESCRIPTION OF THE INVENTION

Figure 1:
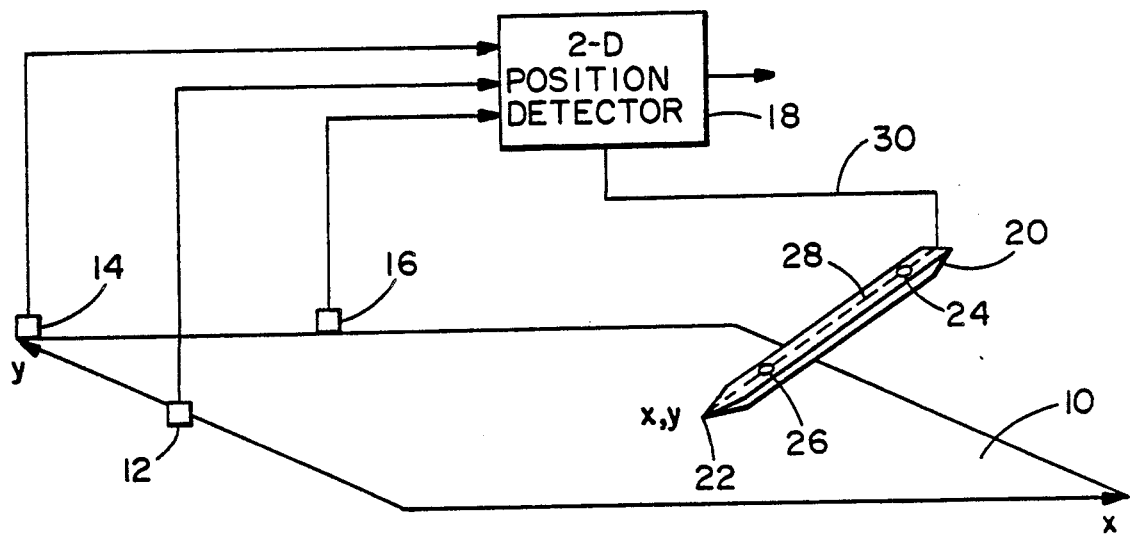
FIG. 1 is a schematic diagram of the invention as it is employed to determine the position of a point in a two dimensional space.

Referring now to FIG. 1, a rectangular two dimensional workspace 10 is is defined by its X and Y boundaries. Work space 10 may contain a drawing, a planar construct or some other planar arrangement whose points are to be digitized, for either display on a computer terminal or for storage in a computers memory. Three acoustic receivers 12, 14, and 16 are arrayed about the perimeter of workspace 10, with each being connected to a two dimensional position detection circuit 18. While acoustic receivers 12, 14, and 16 may be placed arbitrarily about workspace 10, the one constraint is that they should not be placed along a single line. The reason for this will become apparent hereinbelow A stylus 20 is adapted to be moved by a user so that its pointed end 22 touches a point in workspace 10 to be digitized. A pair of acoustic point source transmitters 24 and 26 are mounted on stylus 20 and are oriented along a line 28 which also intersects pointed end 22. Stylus 20 is connected to 2-D position detection circuit 18 via conductor 30.

Broadly stated, the operation of the system of FIG. 1 is similar to the prior art in that acoustic point source transmitters 24 and 26 emit bursts of periodic acoustic oscillations which are sensed by acoustic receivers 12, 14, and 16. By determining the time of arrival of the acoustic signals, the 2-D position detector 18 is able to determine the position in workspace 10 at which point end 22 of stylus 20 is pointed. Furthermore, by properly analyzing these signals, the orientation of stylus 20 can be determined.

As aforestated, two dimensional position detection has been accomplished heretofore, in its most simple form, by employing a pair of acoustic receivers. This geometry has led to a number of disadvantages. First, the Y coordinate value was subject to larger error deviations than the X coordinate value because the Y coordinate value was calculated from a combination of a slant range and the X coordinate value. Any errors associated with the X coordinate value thus combined with errors arising from the measurement of the slant range. Furthermore, a square root function, needed to determine the Y coordinate, did not allow for its sign to be determined. As will be understood below, the use of three acoustic receivers completely avoids the aforestated problems.

Figure 2:
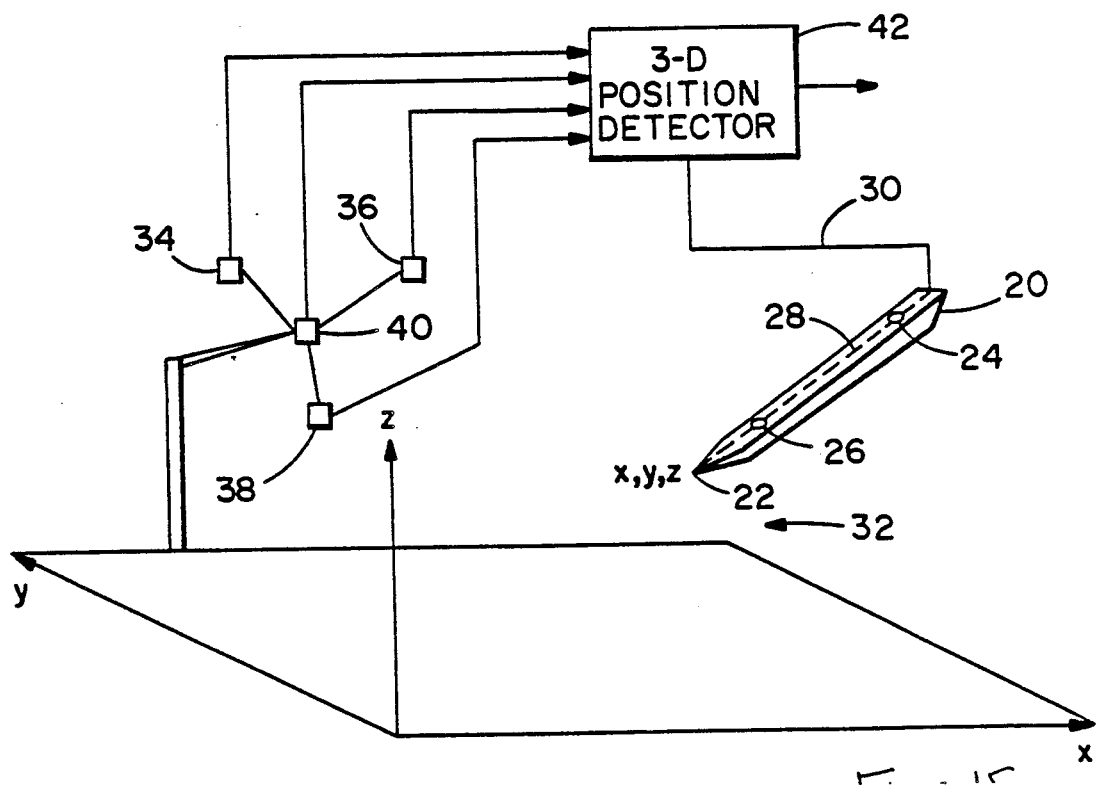
FIG. 2 is a schematic diagram of the invention employed to determine the position of a point in a three dimensional space.

In FIG. 2, the acoustic position digitizing system is shown, as modified for three dimensional point determination. In this case, workspace 32 is three dimensional and is bounded by X, Y, and Z coordinates. The stylus employed is identical to that shown in FIG. 1; however in this case, four acoustic receivers 34, 36, 38, and 40 are arrayed around workspace 32. Each receiver is arranged so that it is capable of receiving acoustic signal emanations from either of point source transmitters 24 or 26. Acoustic receivers 34, 36, and 38 are arrayed in one plane whereas acoustic receiver 40 is positioned in a different plane. Outputs from each of the aforestated receivers are fed to three dimensional position detection circuit 42.

Figure 3:
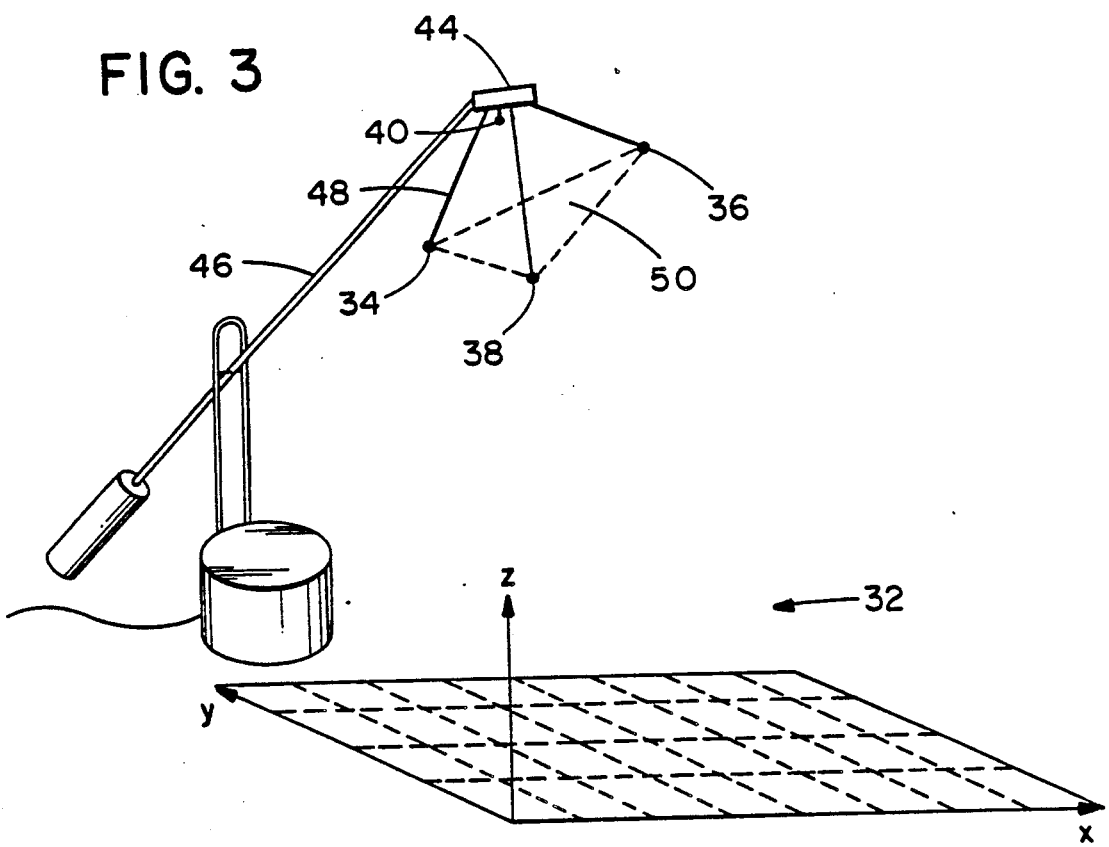
FIG. 3 is a diagram indicating how the acoustic receivers, shown schematically in FIG. 2, may be positioned to properly receive the emitted acoustic signals from a stylus or puck.

In FIG. 3, a preferred mounting arrangement for each of acoustic receivers 34, 36, 38, and 40 is shown. All of the receivers are supported by head 44 which is, in turn, mounted at an end of cantilever beam 44. Each of the receivers is attached to a connecting post 48 which provides both mechanical support and electrical connection to the position detection circuitry. Receivers 34, 36, and 38, are arrayed in plane 50 while receiver 40 is displaced therefrom. This enables the receiver array to be arbitrarily located without degradation of calculated coordinate values due to slant range distance from the array plane. This arrangement also avoids the problems which were inherent in previous three dimensional acoustic array sensing systems which employed only three receivers. In those systems, the Z coordinate was susceptible to larger error deviations than the X and Y coordinate values as it was calculated from a slant range and the X and Y coordinate values. Any errors associated with the X and Y coordinates added to errors due to the measurement of the slant range and thereby contributed to less than desirable accuracy. Sensors 34, 36, 38, and 40 provide independent X, Y, and Z coordinate measurements so that errors do not accumulate for the Z coordinate.

Figure 4:
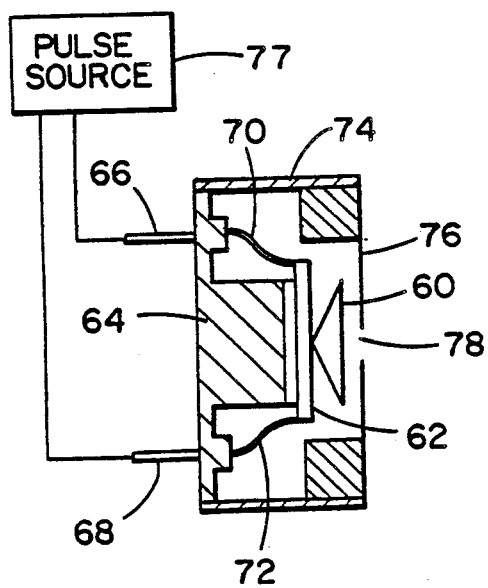
FIG. 4 is a section view of an acoustic point source transmitter.
Figure 5:
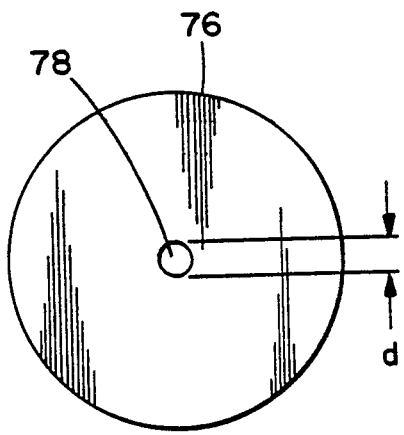
FIG. 5 is a front view of the transmitter of FIG. 4.

Referring now to FIGS. 4 and 5, the structure of an acoustic point source transmitter is shown. Each acoustic transmitter comprises a conical resonator 60 which is mounted on a piezoelectric actuator 62. Both resonator 60 and piezoelectric actuator 62 are mounted on a pedestal 64, and the actuator is connected to pins 66 and 68 via conductors 70 and 72 and thence to pulse source 77. The transmitter structure is mounted in a housing 74 which is provided with a faceplate 76 (see FIG. 5). An opening 78 is centrally located in faceplate 76 and provides a "point source" effect for the acoustic emanations produced by piezoelectric actuator 62 and resonator 60. The diameter d of opening 78 involves a trade off between emitted power and wave front beam width.

As can be seen from FIG. 6, when piezoelectric actuator 62 is energized, it creates an acoustic wavefront 80. When wavefront 80 passes through opening 78, assuming opening 78 is sufficiently small, the transmitted waveform assumes an omnidirectional wavefront 82 due to diffraction beam-width formation. However, if opening 78 is made too small, the power of the transmitted acoustic signal is greatly constrained. On the other hand, if it is made too large, wavefront 82 is distorted with poor side lobe beam patterns. From the system standpoint, it is most desirable that wavefront 82 be as close to omnidirectional as possible so the diameter d of opening 78 is made as small as possible.

To overcome the power reduction created by a minimum diameter opening 78, it has been found that piezoelectric actuator 62 can be pulsed with high voltage pulses while still remaining within the allowable power dissipation limits of the actuator. One piezoelectric actuator which is commercially available from the Panasonic Corporation, when energized, provides a 40 kHz output frequency. Its specifications call for a maximum voltage rating of 20 volts for continuous operation. It has been found that by applying a 300 volt pulse for 100 microseconds, at a repetition rate of one pulse every five miliseconds, that the output transmitted acoustic energy can be substantially increased without creating damage to actuator 62. Furthermore, the application of this extremely high energizing potential creates a better omnidirectional beam pattern and improved amplitude signal levels. It has been found that if the applied voltage pulse level to actuator 62 is reduced, the beam pattern degrades and the amplitude of the transmitted acoustic signal drops. Thus, it is preferred that the level of the applied voltage pulse and its duty cycle be such that it not exceed the maximum power rating of the actuator, but that the voltage be such that it substantially exceeds the applied voltage rating of the device. It should be understood that the above-noted values are merely exemplary and that the values employed with actuators having differing specifications will vary in accordance with the above teachings.

Referring now to FIG. 7, an exploded view of an acoustic receiver is shown. The acoustic receiver comprises an electret membrane 90 mounted on an electrode ring 92. A rear electrode plate 94 is mounted behind the front electrode ring and the entire structure is contained within housing 96. While not shown, a field effect transistor is connected to one of the electrode plates to amplify the signal created by the movement of membrane 90 in response to a received acoustic signal. A face plate 98 having an opening 100 is positioned over the receiving structure. As with the acoustic transmitters, opening 100 provides a "point source" reception capability. The operation of the receiver is conventional and will not be further described.

Referring now to FIG. 8, an alternative position encoder is shown in lieu of stylus 20 (see FIG. 1). Position encoder 101 (hereinafter called a "puck") comprises a housing 102 which has an aperture 104 in which a pair of crosshairs 106 and 108 are positioned. Crosshairs 106 and 108 may be embedded in a transparent glass or polystyrene that enables a user to see the underlying workspace and to precisely position crosshair point 110.

A pair of acoustic transmitters 112 and 118 are centered along a line coincident with crosshair 106 and are equidistant from crosshair point 110. A depressible selection bar 120 enables a user to provide an output pulse on line 30 when crosshair point 110 is positioned over a surface point to be digitized. As is well known, the puck 101 is placed flat on a workspace (e.g. workspace 10 in FIG. 1) and is moved thereabout to position the crosshair point 110 over a surface point to be digitized, at which time, the user depresses bar 120 and causes the transmitters 112 and 118 to emit pulses of acoustic energy to receivers positioned about the workspace.

Figure 9:
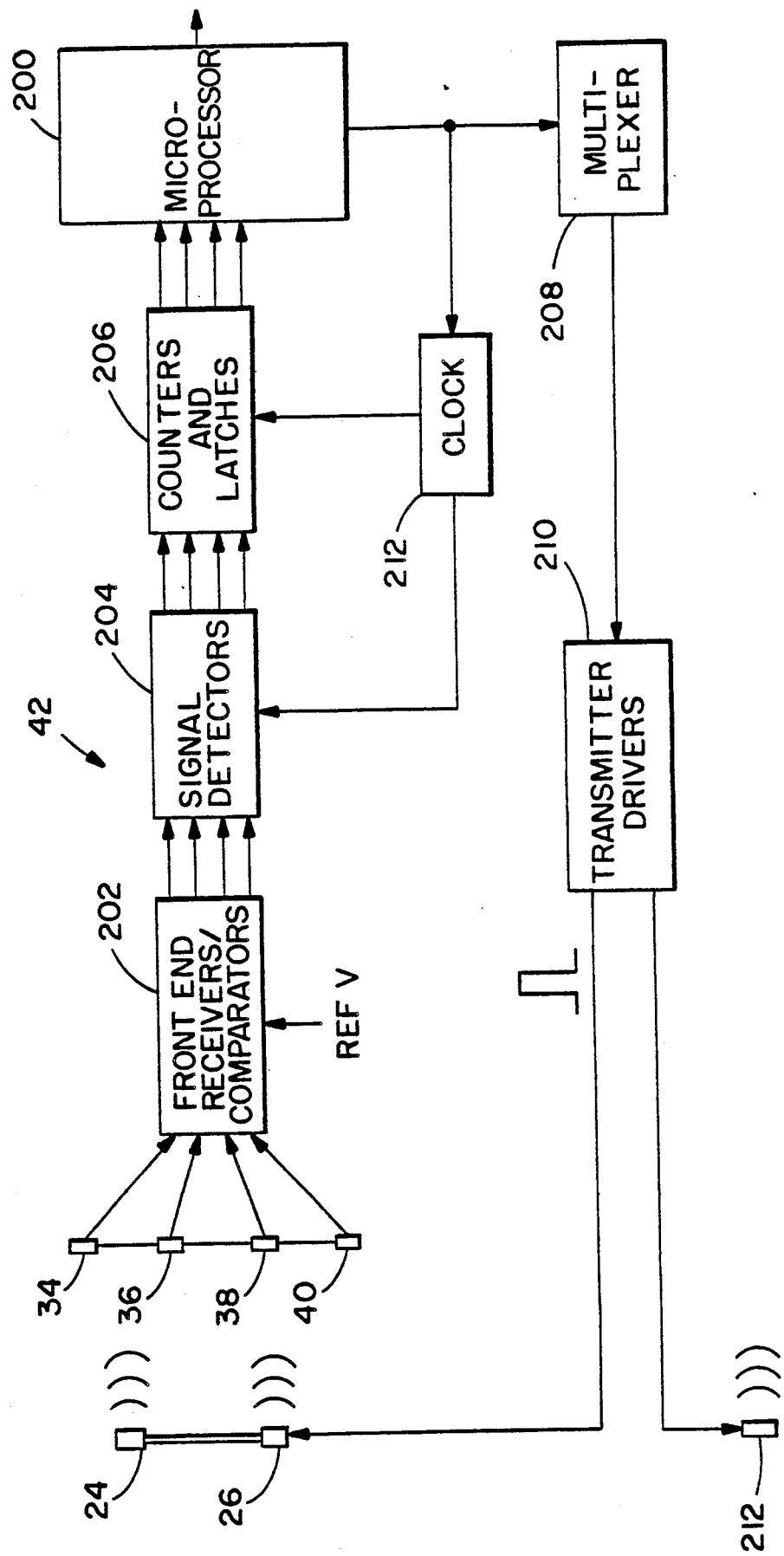
FIG. 9 is a block diagram of the position detection circuitry used by the invention.

In FIG. 9, a block diagram is shown of the circuitry employed to determine the range from one or more acoustic transmitters to the acoustic receivers and to then process that range information to arrive at a digitization of a point in the workspace. All circuitry shown in FIG. 9 is under control of microprocessor 200, however the control lines have been omitted to avoid unnecessarily complicating the diagram. The circuitry of FIG. 9 implements the 3-D position detector 42 shown in FIG. 2.

Acoustic point source transmitters 24 and 26 are alternately pulsed to generate periodic acoustic signals which are transmitted towards acoustic receivers 34, 36, 38, and 40. Each acoustic receiver feeds an independent circuit which comprises a front end receiver/comparator 202, a signal detector 204, and a counter and latch 206. While these independent signal chains are not shown separately on FIG. 9, it is to be understood that front-end receivers/comparators 202 contains four separate front-end receivers, comparators, signal detectors, etc.

Thus, a received acoustic signal is passed from its acoustic receiver (e.g. 34) to an associated front end receiver 202 where it is amplified and applied to a comparator. The comparator (also sometimes called a zero crossing detector) is an analog circuit which outputs a high logical level when its analog input traverses in a positive going direction past a reference voltage and it outputs a down level when its analog input traverses in a negative going direction past the reference voltage. In essence, therefore, the comparator is a wave shaper which converts an analog burst of period acoustic oscillations to a series of square waves whose positive and negative going transitions are coincident with the positive and negative going transitions of the analog signal.

Signal detector 204 receives the square wave output from the comparator and both detects the leading edge of the first square wave (or a subsequent one) and determines that it is, in fact, a portion of a cycle from a received acoustic signal. Assuming that the signal is identified as an acoustic signal by detector 204, a stop pulse is generated to a counter and latch circuit 206. Previously, microprocessor 200, via multiplexer 208 and transmitter drivers 210 caused acoustic transmitter 24 to emit an acoustic signal. At the same time, a clock signal was applied from clock 212 to a counter in counters and latches 206. When that counter receives a pulse "stop" signal from signal detector 204, it stops the count and enters it into a latch whose output is, in turn, fed to microprocessor 200. That count is then used by microprocessor 202 to determine the slant range of acoustic transmitter 24 from acoustic receiver 34. The range circuits associated with each of acoustic receivers 36, 38, and 40 act identically to that above described. Multiplexer 208 causes transmitter drivers 210 to alternately apply energizing pulses to transmitters 24 and 26 so that the slant range to those transducers can be alternately detected and calculated. Additionally, a correction transducer 212 is provided which, prior to each range measurement, sends out an acoustic signal which is sensed by acoustic receivers 34, 36, 38, and 40 and is subsequently processed to determine the slant range to the correction transmitter. The position of transmitter 212 is fixed so that microprocessor 200 is able to derive a correction factor from that range measurement. That correction factor is used to alter a subsequent measurement to take into account any atmospherically induced changes in the transmitted signal's transit time.

Referring now to FIG. 10, a preferred signal detector circuit is illustrated. The circuit in FIG. 10 is designed to detect the "front porch" of the first positive going half cycle of a received signal from receiver/comparator circuit 202. The detector circuit comprises a serial shift register 250, each of whose stages has an output which feeds into a multiple input NAND gate 252. The output of NAND gate 252 reflects an up level on line 254 at all times except when there is a "one" bit in each stage of shift register 250, at which time its output on line 254 falls. A shift clock is applied via conductor 256 to shift register 250 and steps input signals appearing on line 258 into the register.

If it is assumed that waveform 260 evidences the initially transmitted first half cycle from stylus 20, and that a resulting received signal 262 is impressed on line 258, it can be seen that the voltage levels shifted into shift register 250 will represent waveform 262. Assuming that there are sufficient stages in shift register 250 to hold only a portion of a half cycle of waveform 262, all stages thereof will reflect the "one" state, a determined number of shift clock pulses after the arrival of the high state 263 of waveform 262. When all stages of shift register 250 evidence the "one" level, NAND gate 252 drops its output. That drop in output causes a counter in counters and latches 206 to cease counting, with the count indicative, after processing, of the time of transmission of a transmitted signal between an acoustic transmitter and receiver.

If the number of stages in shift register 250 is sufficient to handle a full half cycle of waveform 262, then stop pulse 264 on line 254 will be as shown, with its duration equal to the duration of one shift clock pulse. If the capacity shift register 250 is less than the duration of half cycle of input signal 262, then stop pulse 264 will exhibit a down level until the first zero appears in shift register 250. In either case, it is the leading edge of stop pulse 264 which causes the associated counter to cease its count.

Microprocessor 200, knowing the number of shift pulses required to fill shift register 250, converts that number to a time and subtracts it from the time indicated by the counter and thus obtains a direct indication of the time of signal transmission between the acoustic receiver and transmitter. The circuit of FIG. 10 therefore, detects the half cycle waveform 262 and determines that it is, in fact, a signal from an acoustic transmitter.

While the signal detector in FIG. 10 is implemented with a shift register, it is to be understood that any circuit which is capable of determining the presence of a return signal from incoming noise may be employed, assuming that it is reasonably economical to implement. For instance, a counter can be substituted for shift register 250, with the input signal's "front porch" being used to gate stepping pulses into the counter. When the predetermined count is reached, the presence of a return signal is confirmed and a "stop" pulse generated.

If a noise signal is received, and its duration is equal to or longer than the duration of shift register 250, an erroneous range output will occur. Thus if the invention is to be operated in a noisy environment, a somewhat more costly, less noise susceptible circuit for noise detection is desirable and is shown in FIG. 11.

Figure 11:
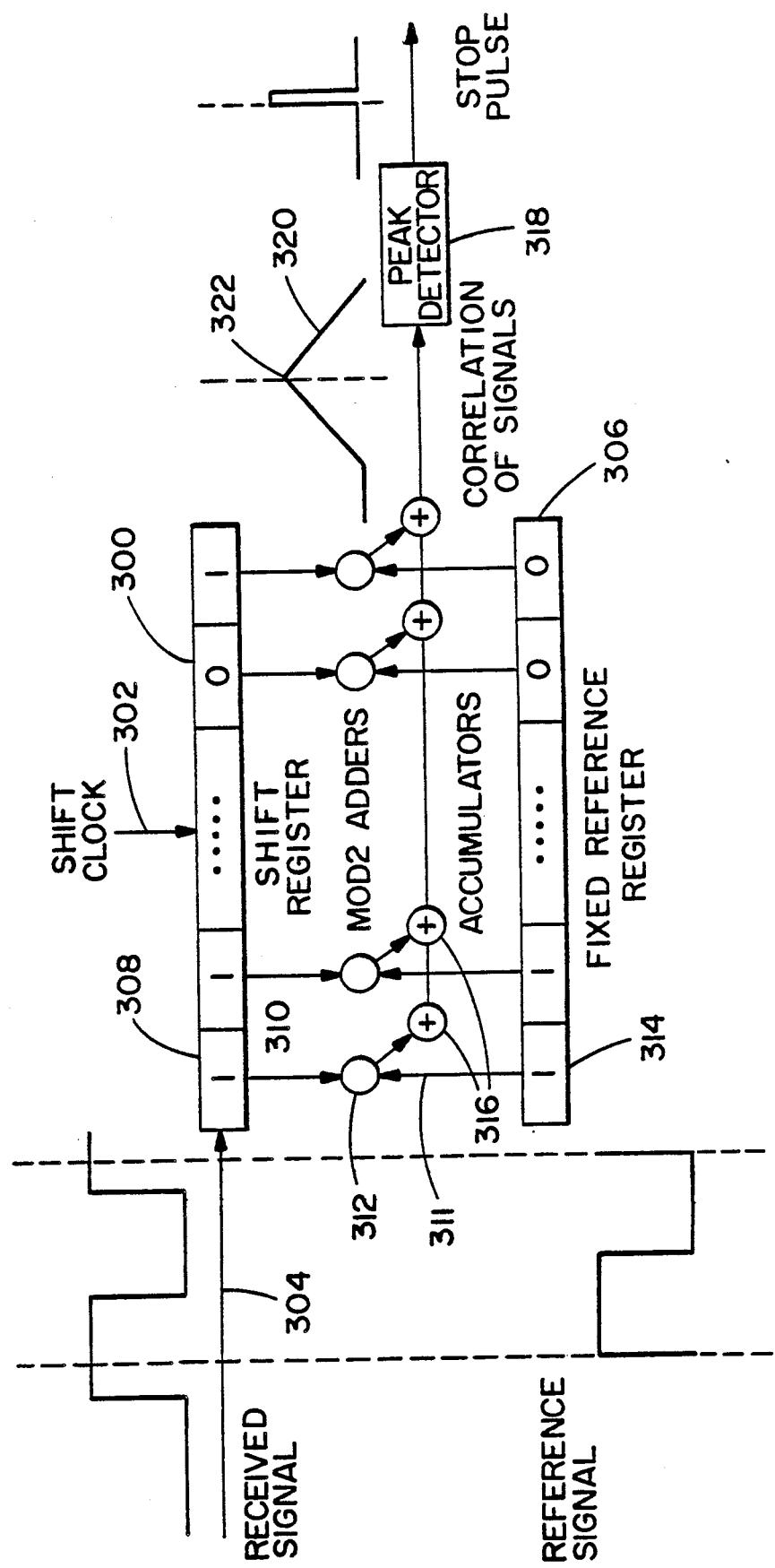
FIG. 11 is a schematic block diagram of another signal correlation detection circuit which is more resistant to noise than the circuit of FIG. 10.

In FIG. 11, serial shift register 300 has, for example any purposes, a sufficient number of stages to contain an entire full cycle of a received acoustic signal when it is clocked by shift clock over line 302. The system of FIG. 11 will also function if shift register 300 includes enough stages to contain either less than or more than one cycle of a received acoustic signal.

A received signal is impressed upon input line 304 and its levels are shifted into shift register 300 as they are received from the receiver/comparator circuit 202. A replica of the transmitted (reference) signal is permanently fixed in reference register 306, with register 306 having an identical number of stages as shift register 300. At each shift interval, the levels in the corresponding stages of serial shift register 300 and reference register 306 are compared in a mod 2 adder circuit. For instance, the level in stage 308 is fed via line 310 to mod 2 adder 312 and the level from reference register stage 314 fed via line 311 to mod 2 adder 312. There is one mod 2 adder for each pair of register stages and, at each shift time, their outputs are collectively fed to a chain of accumulators 316, which accumulators provide a sum of the resultant signals to peak detector 318.

Those skilled in the art will recognize that the circuit shown in FIG. 11 bears a resemblance to a correlation circuit which correlates the wave shape of a received signal on line 304 to the wave shape of a reference signal stored in register 306. As the received signal begins to shift into shift register 300, the sum value from accumulators 316 starts to increase as shown by waveform 320. When the received signal is fully present in shift register 300 (in phase with the signal levels in reference register 306), the level from accumulators 316 reaches a peak 322 (waveform 320) and then begins to decrease as the received signal shifts further through register 300. Peak 322 is detected by peak detector 318 which provides a stop pulse to a counter in counters and latches 206.

As with the circuit of FIG. 9, microprocessor 200 subtracts the time required to insert the received signal into shift register 300 from the time indicated by the counter clock circuit to thereby derive the actual time of transmission of the acoustic signal. The circuit of FIG. 11 is highly specific to the transmitted frequency and is able to differentiate that signal from all others and provides a high noise-immune detection circuit.

Microprocessor 200, in response to determining the slant ranges between transmitters 24 and 26 and receives 24, 26, 38, and 40 performs a number of additional calculations to derive the position in the workspace of the stylus point or puck crosshair. These calculations are described herein below.

TWO DIMENSIONAL MATHEMATICS, CALIBRATION AND ALGORITHM

The measured slant ranges must be transformed to x and y coordinate values. The set-up and location of the receivers plays an important role in overall system accuracy.

This section discusses a geometry that uses three receivers to determine the x and y coordinates. The geometry allows arbitrary receiver location for workspace placement. The three receivers provide independent x and y coordinate measurements so that errors do not accumulate with the y coordinate. The three receivers also allow the calculation of stylus orientation so that offset errors to the actual digitized point can be corrected for. Finally, if the receiver array is calibrated with respect to known calibration point locations, the acoustic scale factor will be less sensitive to offset errors, and the final accuracy of the system will be based primarily on the known calibration point location accuracy.

Figure 12:
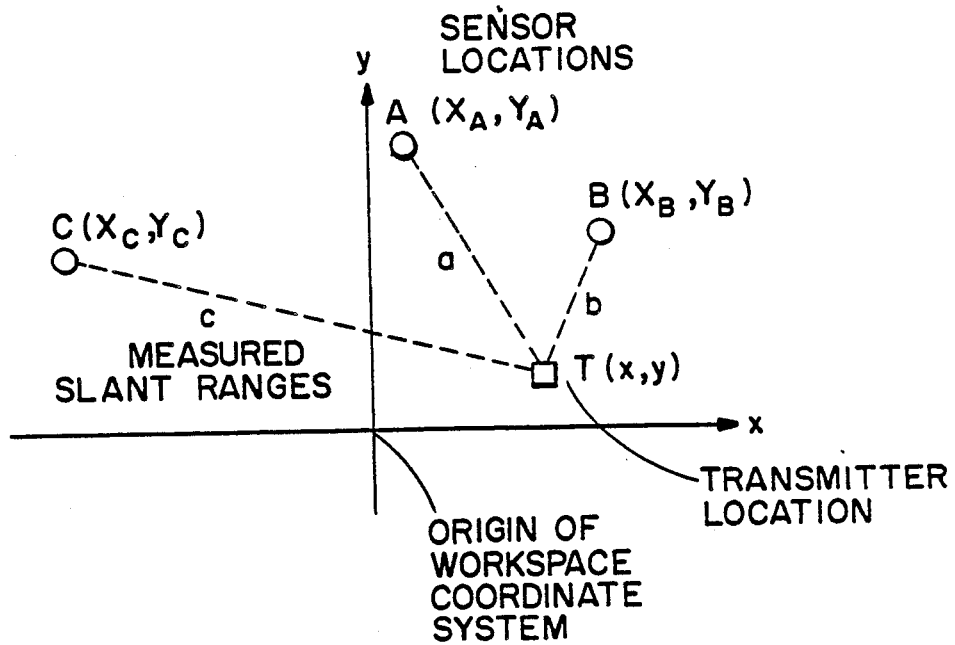
FIG. 12 defines the points used in the two dimensional position determination mathematics.

FIG. 12 shows the 2-D geometry. The receiver locations are defined for receivers A, B, and C. The range distances between the receivers and transmitter (a, b, and c) are measured with the acoustic hardware, and stored for each receiver. The receivers are all located in the same plane, and the receivers can be located arbitrarily so long as they do not form a straight line.

Simultaneous equations can be set up for the slant ranges with respect to the coordinate position of a transmitter and the coordinate positions of the receivers as follows:

$$a^2=(x-X_A)^2+(y-Y_A)^2$$

$$b^2=(x-X_B)^2+(y-Y_B)^2$$

$$c^2=(x-X_C)^2+(y-Y_C)^2$$

The complete solution for the above equations can be shown to be:

$$x=(a_{11}b_{11}+a_{12}b_{21})e$$

$$y=(a_{21}b_{11}+a_{22}b_{21})e$$

where $$D=X_A-Y_C)(Y_B-Y_C)-(X_B-I_C)(Y_A-Y_C)$$

$$e=1/2D$$

$$a_{11}=Y_B-Y_C, a_{12}=Y_C-Y_A$$

$$a_{21}=X_C-X_B, a_{22}=X_A-X_C$$

$$b_{11}=R^2_A-R^2_C+c^2-a^2,$$

$$b_{21}=R^2_B-R^2_C+c^2-b^2$$

A z coordinate can be calculated based on a slant range, and the x, y coordinate values. However, two restrictions are needed: first the transmitter must not approach the receiver plane since z accuracy deteriorates quickly with small slant range differences, and secondly the value is calculated with a square root function so that the sign of the coordinate cannot be determined. Both of these restrictions are eliminated with the 3-D geometry using four receivers (discussed below). The z coordinate value is $$z=\sqrt{|c^2-(x-X_c)^2-(y-Y_c)^2|}$$

TWO DIMENSIONAL CALIBRATION

Calibration of the receiver array is important to the accuracy of the system. There are several preferred ways to calibrate the system.

The first method requires precisely mounting the receivers at known distances so that their Cartesian coordinates are known for initializing the geometry. Usually, placement of the receivers along symmetrical axes will reduce the complexity of the geometry, such that in the extreme case, only the distance between them is required. The receivers can be mounted with respect to the workspace coordinate system, or they can be mounted on a separate base and referenced only to itself. The final alignment of receiver coordinates and workspace coordinates can be found by rotation and translation.

Figure 13:
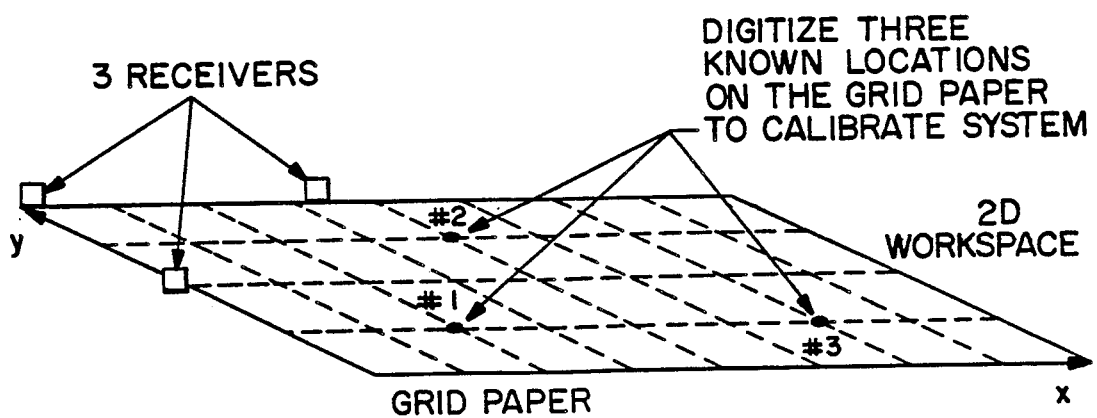
FIG. 13 shows an arrangement for calibration of the invention.

A preferred method is to set a piece of grid paper on the workspace surface, and arbitrarily set the receivers in convenient locations as shown in the FIG. 13. (An error analysis indicates the best accuracy is obtained if the receivers are approximately placed at right angles, and separated by a reasonable distance.) Three known points can be digitized on the grid paper, and by reversing the geometry equations (i.e. the three digitized points become the receiver positions in the original geometry and a single receiver location becomes the transmitter location in the original geometry), the receiver coordinate locations can be mapped. Now the receiver coordinate system is completely referenced to the workspace coordinate system, and rotation and translation is not required to align the two coordinate systems.

TWO DIMENSIONAL ALGORITHMS

The complete procedure for determining a 2-D position with three receivers is outlined below in A-E. (See FIG. 12 for definitions of transmitter and receiver locations.)

A Initialize parameters:
  $r_{max}$=maximum slant range allowed (counts)
  s=scale factor from reference correction (in/count)
  $b_c$=delay bias constant (counts)
  $R'_A=X_A^2+Y_A^2, R!_B=X_B^2+Y_B^2, R'_C=X_C^2+Y_C^2$ $R'_{AC}=R'_A-R'_o, R'_{BC}=R'_B-R'_C$ $D=(X_A-X_C)(Y_B-Y_c)-(X_B-X_C)(Y_A-Y_C)$ $e=1/2D$ $a_{11}=Y_B-Y_C, a_{12}=Y_C-Y_A$ $a_{21}=X_C-X_B, a_{22}=X_A-X_c$ B Fire the emitter:
  Read ranges a', b',c'(counts)
  Check for invalid data: If any ranges are greater than $r_{max}$ then fire the emitter again and repeat steps.

C Subtract delay (counts and scale the measured slant ranges (inches):

$a=s(l'-b_e), b=s(b'-b_e), c=s(c40-b_e)$

D Calculate Cartesian coordinates (inches):

$b_{11}=R'_{AC}+c^2-a^2, b_{21}=R'_{BC}+c^2-b^2$ $x=(a_{11}b_{11}+a_{12}b_{21})e$ $y=(a_{21}b_{11}+a_{22}b_{21})e$

E Translate to workspace coordinate system (by $X_3,Y_e$,) if required:

$x' = x + x_e$ $y' = y + y_e$

THREE DIMENSIONAL MATHEMATICS, CALIBRATION AND ALGORITHM

The measured slant ranges must be transformed to x, y, and z coordinate values. The set-up and location of the receivers plays an important role in the overall system accuracy.

The following sections discuss a geometry that uses four receivers to determine the x, y, and z coordinates. The geometry allows arbitrary receiver location for easier workspace placement. The four receivers provide independent x, y, and z coordinate measurement so that errors do not accumulate with the z coordinate. If the receiver array is calibrated with respect to known calibration point locations, intrinsic functions are not required to rotate the coordinate system to workspace coordinates. Finally, if the receiver array is calibrated with respect to known calibration point locations, the scale factor will be less sensitive to offset errors, and the final accuracy of the system will be based primarily on the known calibration point location accuracy.

THREE DIMENSIONAL SLANT RANGE CONVERSION

Figure 14:
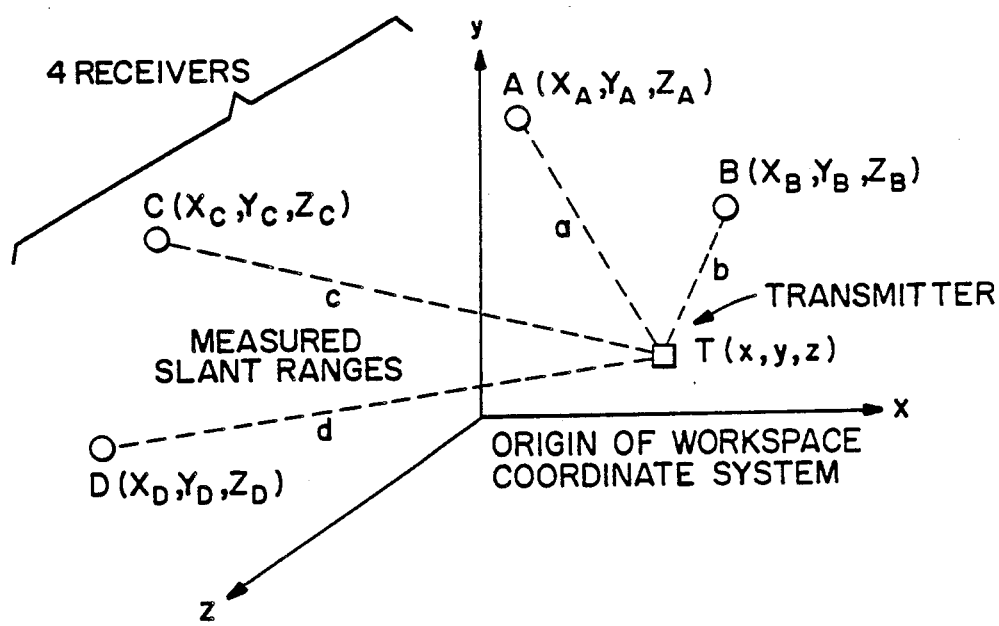
FIG. 14 defines the points used in the three dimensional position determination mathematics.

Four receivers are used to determine the x, y, and z Cartesian coordinates. The four receivers also allow the use of the two transmitter stylus for accurate projection of the coordinate value to the tip of the stylus for minimal offset error. FIG. 14 shows the 3-D geometry The receiver locations are shown for receivers A, B, C, and D. The range distances between the receivers and transmitter (a, b, c, and d) are measured and stored for each receiver. Three of the receivers are located in the same plane and the fourth is offset from this plane. The receivers can be located arbitrarily as long as they are not all in the same plane.

Simultaneous equations for the slant ranges can be set up with respect to the coordinate position of a transmitter and the coordinate positions of the receiver as follows:

$a^2 = (x - X_A)^2 + (y - Y_A)^2 + (z - Z_A)^2$ $b^2 = (x - X_B)^2 + (y - Y_B)^2 + (z - Z_B)^2$ $c^2 = (x - X_C)^2 + (y - Y_C)^2 + (z - Z_C)^2$ $d^2 = (x - X_D)^2 + (y - Y_D)^2 + (z - Z_D)^2$

The above equations can be shown to lead to the following solutions:

$x = (a_{11}b_{11} + a_{12}b_{21} + a_{13}b_{31})e$ $y = (a_{21}b_{11} + a_{22}b_{21} + a_{23}b_{31})e$ $z = (a_{31}b_{11} + a_{32}b_{21} + a_{33}b_{31})e$ where $x_1 = X_A - X_D, y_1 = Y_A - Y_D, z_1 = Z_A - Z_D$ $x_2 = X_B - X_D, y_2 = Y_B - Y_D, z_2 = Z_B - Z_D$ $x_3 = X_C - X_D, y_3 = Y_C - Y_D, z_3 = Z_C - Z_D$ $D = x_1 y_2 z_3 + x_3 y_1 z_2 + x_2 y_3 z_1 - x_3 y_2 z_1 - x_1 y_3 z_2 - x_2 y_1 z_3$ $e = 1/2D$ $a_{11} = y_2 z_3 - y_3 z_2, a_{12} = y_3 z_1 - y_1 z_3, a_{13} = y_1 z_2 - y_2 z_1$ $a_{21} = x_3 z_2 - x_2 z_3, a_{22} = x_1 z_3 - x_3 z_1, a_{23} = x_2 z_1 - x_1 z_2$ $a_{31} = x_2 y_3 - x_3 y_2, a_{32} = x_3 y_1 - x_1 y_3, a_{33} = x_1 y_2 - x_2 y_1$ $b_{11} = R^2_A - R^2_D + d^2 - a^2$ $b_{21} = R^2_B - R^2_D + d^2 - b^2$ $b_{31} = R^2_C - R^2_D + d^2 - c^2$

THREE DIMENSIONAL CALIBRATION

The calibration of the three dimension system is much the same as for the two dimensional system. Three known locations on a grid paper can be digitized to establish receiver coordinate positions. An additional technique makes it possible to extend the concept of digitizing known locations on a grid paper. A reference array of precisely fixed transmitter positions can be located at a convenient position in the workspace. If the reference transmitter array is not moved, the receiver array can be relocated at any time by simply re-initializing the system with the fixed reference array.,

THREE DIMENSIONAL ALGORITHMS

The complete procedure for determining a 3-D position with four receivers is outlined in (A–D) below. (See FIG. 14 for definitions of transmitter and receiver locations.)

A Initialize parameters:
  $r_{max}$ = maximum slant range allowed (counts
  S = scale factor from reference correction (in/count)
  $b_c$ = delay bias constant (counts)

$x_1 = X_A - X_D, y_1 = Y_A - Y_D, z_1 = Z_A - Z_D$ $x_2 = X_B - X_D, y_2 = Y_B - Y_D, z_2 = Z_B - Z_D$ $x_3 = X_C - X_D, y_3 = Y_C - Y_D, z_3 = Z_C - Z_D$ $D = x_1 y_2 z_3 + x_3 y_1 z_2 30$
  $x_2 y_3 z_1 - x_3 y_2 z_1 - x_1 y_3 z_2 - x_2 y_1 z_3$ $e = 1/2D$ $a_{11} = y_2 z_3 - y_3 z_2, a_{12} = y_3 z_1 - y_1 z_3, a_{13} = y_1 z_2 - y_2 z_1$ $a_{21} = x_3 z_2 - x_2 z_3, a_{22} = x_1 z_3 - x_3 z_1, a_{23} = x_2 z_1 - x_1 z_2$ $a_{31} = x_2 y_3 - x_3 y_2, a_{32} = x_3 y_1 - x_1 y_3, a_{33} = x_1 y_2 - x_2 y_1$

B Fire the emitter
  Read ranges a', b', c', d' (counts)
  Check for invalid data: If any ranges are greater than $r_{max}$ then fire the emitter again and repeat steps.
  Subtract delay (counts) and scale the measured slant ranges Inches):

$a = s(a' - b_e), b = s(b' - b_3)$ $c = s(c' - b_3), d = s(d' - b_3)$

C Calculate Cartesian coordinates (inches);

$b_{11} = R'_{AD} + d^2 - a^2$ $$b_{21} = R'_{BD} + d^2 - b^2$$

$$b_{31} = R'_{CD} + d^2 - c^2$$

$$x = (a_{11}b_{11} + a_{12}b_{21} + a_{13}b_{31})e$$

$$y = (a_{21}b_{11} + a_{22}b_{21} + a_{23}b_{31})e$$

$$z = (a_{31}b_{11} + a_{32}b_{21} + a_{33}b_{31})e$$

D Translate to workspace coordinate system (by $x_o, y_o, z_o$) if required:

$$x' = x + x_o$$

$$y' = y + y_o$$

$$z' = z + z_o$$

RATIO SCALING CORRECTION

Range measurement accuracy is affected by the acoustic medium in the workspace. Factors such as temperature, humidity, and air flow affect the speed of sound, and therefore measurement accuracy. If temperature is used to correct the speed of sound constant, then the correction factor at 70° F. is $$V = 13,574 \text{ inches/second.}$$

If the digitizer counters run at 10 MHz, the length per count is:

$$K = \frac{13,574 \text{ in./sec.}}{10 \times 10^6 \text{ counts/sec.}} = .001357 \text{ inches/count.}$$

Prior art units correct for the speed of sound with a temperature probe. The problem with temperature compensation by a probe is that the probe and circuitry have to be extremely accurate and not susceptible to bias or drift. Additionally, temperature is only one of the factors that affect the speed of sound.

This invention uses a method of measuring the reference range with each coordinate measurement, and correcting with a ratio scale factor. The speed of sound constant is not required, and scaling ratios provide the systems acoustic correction.

Figure 15:
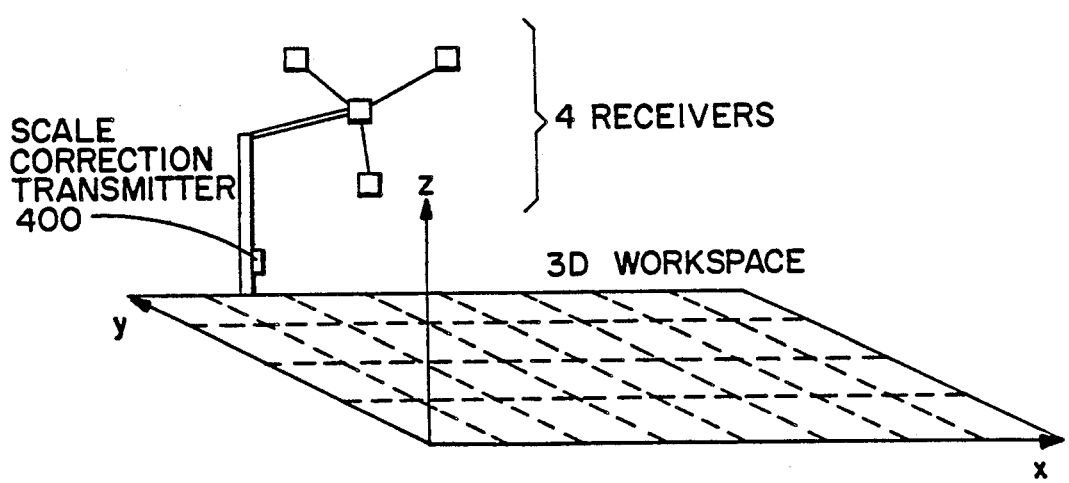
FIG. 15 shows the placement of an additional scaling transmitter used for measurement correction.

A reference correction transmitter 400 (see FIG. 15) is permanently mounted at a precisely known location with respect to a receiver, and fired periodically so that the range values can be rescaled for temperature and other environmental conditions. The following approach is used for range scaling:

range (inches) =

$$\frac{\text{reference distance (inches)}}{\text{measured reference range (counts)}} \times \text{measured range (counts)}$$

or in mathematical form,
  r' = actual reference range distance
  r = measured reference range corresponding to r'
  $b_c$ = constant delay bias of circuitry $$s = \frac{r'}{r - b_c}$$

Correct the range measurement for each receiver:
$a = s(a - b_c)$ $b = s(b - b_c)$ $c = s(c - b_c)$ $d = s(d - b_c)$ This invention uses a method of measuring the reference range with each coordinate measurement, and correcting with a ratio scale factor. The speed of sound constant is not required, and scaling ratios provide the systems acoustic correction.

The steps for system calibration are as follows:
1. Place the grid paper on the workspace (flat table top).
2. Place the receiver array anywhere to one side of the workspace
3. Digitize the calibration points on the grid paper.
4. The scaling transmitter mounted on the array base is fired for a reference range.

The computer calibration and scaling procedure employs the above derived data as follows:
1. The systems constants are initialized.
2. For each point measured above, the ranges are scaled and two range values (from two transmitters on the puck) are used to calculate the ranges to the center of the crosshair for each calibration point.
3. The measured range values from above are stored: 3 digitized points, and 4 receivers for a total of 12 ranges.
4. The x, y, z coordinate for each receiver is calculated.
5. Based on the receiver coordinates, matrix coefficients are calculated (these coefficients are used in the final solution for normal digitizing).

Now the user can digitize any point in the workspace, and get an x, y, z coordinate value (and stylus orientation if required). The user simply places the stylus tip on the point to be digitized. The steps below outline what the computer software does to convert and scale the coordinate values:
1. The computer polls the stylus and waits for it to be activated (e.g. by the user pressing a switch on the stylus).
2. When ready to digitize, a first transmitter on the stylus is fired and the four range distances to the receivers are stored.
3. A second transmitter on the stylus is fired, and the four range distances to the receivers are stored.
4. The reference transmitter on the base of the receiver array is fired, and the range distance to the receiver is stored.
5. The actual reference range is divided by the scale range measurement from the reference transmitter on the receiver base to form the final scale correction factor. The range values are multiplied by the scale factor to provide the corrected range values.
6. Range measurements from the transmitters on the stylus are used to calculate the x, y, z coordinates at the stylus tip, and stylus orientation angles.

It is to be noted that the speed of sound constant is never used in this procedure, only scaling ratios.

SCALE RATIO ALGORITHM

A-D below show the algorithms which allow the conversion of a binary range number to inches while scaling the range to correct for environmental changes that effect the speed of sound.
  A Sonic Correction:
    Fire reference emitter.

Read ranger r (16 bit count)
Check for invalid data:

If $r > r_{max}$ then repeat above steps.

B Determine scale factor (inches/count):

$$s = \frac{r'}{r - b_c}$$

where
r' = actual reference range distance (in.)
r = measured correction corresponding to r'(counts)
$b_c$ = constant delay bias of circuitry (counts)
C Start digitizing actual data:
Fire the selected digitizer source emitter.
Read ranges a',b',c', d' (16 bit count)
Check for invalid data:

If ranges are greater than $r_{max}$ then repeat steps.

Subtract the delay (counts) and scale the digitized ranges (inches):

$$a = s(a' - b_e)$$
$$b = s(b' - b_e)$$
$$c = s(c' - b_e)$$
$$d = s(d' - b_e)$$

It should be understood that the foregoing description is only illustrative of the invention. Various alternatives and modifications can be devised by those skilled in the art without departing from the invention. For instance, while the acoustic transmitters have been shown as parts of a stylus or puck, they could be attached to any moving body in the work space, e.g., to a human's arm, for L instance, when it is desired to study the arm's movements under predetermined conditions. With one acoustic transmitter, single point coordinates can be determined for three coordinate space tracking of point or object positions. With two acoustic transmitters, the invention is able to determine position, pitch and yaw. If a third acoustic transmitter is added, roll can be determined, so long as the third transmitter is not located in the same line as the other two transmitters. Additionally, while a single set of acoustic receivers has been described, added sets of receiver groups may be positioned about the work space (1) to accommodate barriers which may block the signals to one group of receivers, and not another or (2) to accommodate too great attenuation of received signals due to the distance between receivers and transmitters. Accordingly, the present invention is intended to embrace all such alternatives, modifications an variances which fall within the scope of the appended claims.

I claim:

1. An acoustic position sensing apparatus for determining the position of an indicator in relation to a datum surface, said apparatus comprising:
    acoustic point source transmission means on said indicator, for transmitting a sequence of periodic acoustic oscillations;
    a plurality of acoustic receivers positioned about said datum surface for receiving said acoustic oscillations;
    Comparator means connected to each acoustic receiver for converting said received acoustic oscillations to squared waves having logical up and down levels and step transitions therebetween;
    Detection means coupled to each said comparator means for determining from at least a leading portion of a squared wave that said squared wave has resulted from an acoustic oscillation generated by said acoustic point source transmission means, and providing an output upon making such a determination, which is indicative of an occurrence of a step transition of said squared wave; and means responsive to said outputs from said detection means for finding the position of said indicator.

2. The invention of claim 1 wherein said detection means comprises:
    a multistage, serial shift register;
    clock means for stepping an input signal into the stages of said shift register;
    logical means responsive to an identical logical level in a pre-set number of said stages to provide an output.

3. The invention of claim 2 wherein said clock means steps into said shift register only a portion of a square wave to fill said preset number of stages.

4. The invention of claim 3 further comprising:
    a counter for each said receiver;
    means for starting each said counter when said acoustic point source transmission means commences transmitting said acoustic oscillations;
    means for latching a count in each said counter in response to a logical means output.

5. The invention of claim 1 wherein said detection means includes a counter which is stepped during at least said portion of a square wave.

6. The invention of claim 1 wherein said detection means include a correlation circuit comprising:
    a multi stage serial shift register for receiving said square waves from said comparator means;
    a multistage reference register containing a fixed square wave representative of one cycle of said transmitted acoustic oscillations;
    means for correlating the contents of said registers as said square wave is fed from said comparator means into said first register and for producing an output whose amplitude indicates a level of correlation therebetween; and
    means for detecting a peak level of said output from said correlating means and for producing a stop count signal.

7. The invention of claim 6 further comprising:
    a counter for each said receiver;
    means for starting each said counter when said acoustic point source transmission means commences transmitting said acoustic oscillation; and
    means for stopping each said counter in response to a logical means output.

8. The invention of claim 7 wherein said correlating means comprises;
    a mod 2 adder connected between corresponding stages of said serial shift register and said references register; and
    accumulation means connected to said mod 2 address for summing outputs therefrom to provide said output whose amplitude indicates the level of correlation therebetween.

9. The invention as defined in claim 1 wherein said datum surface is a two dimensional surface and said plurality of acoustic receivers consist of three receivers, two oriented along one dimension of said surface and another oriented along a second dimension of said surface.

10. The invention of claim 9 wherein one of said two receivers is oriented at an intersection of said two dimensions.

11. The invention as defined in claim 1 wherein said datum surface is a three dimensional surface and said plurality of acoustic receivers consist of 4 receivers, three of said receivers oriented in one plane adjacent said datum surface and the fourth in another plane.

12. The invention as defined in claim 1 wherein said acoustic point source transmission means comprises:
a housing having an inner space and an aperture communicating with said inner space, said aperture being sized to approximate a point source for said transmitter;
transducer means mounted in said housing for generating, in response to an energizing voltage pulse, ultrasonic acoustic signals which pass through said aperture and create a uniform beam pattern; and
means for applying energizing voltage pulses to said transducer means, each said energizing voltage pulse exhibiting a voltage which substantially exceeds the rate continuous voltage for said transducer means, the duration and voltage level of said pulses being selected so as to cause the dissipated power from said transducer means not to exceed said transducer means maximum power rating.

13. The invention as defined in claim 1 wherein said indicator comprises:
a pair of point source acoustic transducers;
means for supporting said transducers in a spaced apart relationship along a common line, said supporting means further having indicator means located on said line, said supporting means further being movable by hand across said datum surface to indicate a point on said surface.

14. The invention as defined in claim 13 wherein said supporting means is substantially planar in shape, wherein said indicator means is positioned between said transducers.

15. The invention as defined in claim 13 wherein said indicator means is positioned along a straight line between said transducers and said indicator means comprises an opening in said supporting means with crosshair mounted therein, a point of intersection of said crosshairs positioned on said line.

16. The invention as defined in claim 13 wherein said supporting means is a stylus with a pointed end, said indicator means being said pointed end, one said transducer position at a proximal end of said stylus, another said transducer at a distal end near said pointed end.

17. An acoustic transmitter comprising:
a housing having an inner space and an aperture communicating with said inner space, said aperture being sized to approximate a point source for said transmitter;
transducer means mounted in said housing for generating, in response to an energizing voltage pulse, ultrasonic acoustic signals which pass through said aperture and create a uniform beam pattern; and
means for applying energizing voltage pulses to said transducer means, each said energizing voltage pulse exhibiting a voltage which substantially exceeds the rated continuous voltage for said transducer means, the duration and voltage level of said voltage pulses being selected so as to cause the dissipated power from said transducer means not to exceed said transducer means maximum power rating.

18. An acoustic position sensing apparatus for determining the position of an indicator in relation to a datum surface, said apparatus including acoustic point source transmission means on said indicator for transmitting a sequence of periodic acoustic oscillations, said transmission means comprising:
a pair of point source acoustic transducers;
means for supporting said transducers in a spaced apart relationship along a common line, said supporting means further having indicator means located on said line, said supporting means further being movable by hand across said datum surface to indicate a point on said surface, said supporting means being substantially planar in shape, and said indicator means being positioned between said transducers.

19. The invention as defined in claim 18, wherein said indicator means is positioned along a straight line between said transducers and said indicator means comprises an opening in said supporting means with crosshairs mounted therein, a point of intersection of said crosshairs positioned on said line.

* * * * *